(12) United States Patent
Tatsumi et al.

(10) Patent No.: US 7,076,918 B2
(45) Date of Patent: Jul. 18, 2006

(54) WINDOW REGULATOR

(75) Inventors: Hisato Tatsumi, Yokohama (JP); Yasuo Ohtsuki, Yokohama (JP); Syunsuke Tamura, Kawasaki (JP); Kazuyuki Sasaki, Yokohama (JP); Kenichi Hirooka, Yokohama (JP)

(73) Assignees: Ohi Seisakusho Co., Ltd., Kanagawa (JP); Nissan Motor Co., Ltd., Kanagawa (JP)

( * ) Notice: Subject to any disclaimer, the term of this patent is extended or adjusted under 35 U.S.C. 154(b) by 144 days.

(21) Appl. No.: 10/610,768

(22) Filed: Jul. 2, 2003

(65) Prior Publication Data
US 2004/0074149 A1   Apr. 22, 2004

(30) Foreign Application Priority Data
Jul. 3, 2002   (JP) ............................. 2002-194545

(51) Int. Cl.
*E05F 11/48* (2006.01)
(52) U.S. Cl. .............................. 49/352; 49/349; 49/374
(58) Field of Classification Search ................ 49/352, 49/349, 348, 374, 502
See application file for complete search history.

(56) References Cited

U.S. PATENT DOCUMENTS

| | | | | |
|---|---|---|---|---|
| 3,466,802 A | * | 9/1969 | Doveinis et al. ............... | 49/428 |
| 3,844,064 A | * | 10/1974 | Yamaha et al. ................ | 49/348 |
| 3,868,788 A | * | 3/1975 | Podolan ........................ | 49/374 |
| 4,069,617 A | * | 1/1978 | Koike ........................... | 49/428 |
| 4,494,336 A | * | 1/1985 | Ishii et al. ..................... | 49/352 |
| 4,663,886 A | * | 5/1987 | Nakamura et al. ............. | 49/360 |
| 4,706,412 A | * | 11/1987 | Kobrehel ...................... | 49/352 |
| 4,829,630 A | * | 5/1989 | Church et al. ............... | 16/93 R |
| 4,888,916 A | * | 12/1989 | Hess et al. ..................... | 49/352 |
| 4,899,492 A | * | 2/1990 | Szerdahelyi ................... | 49/352 |
| 5,009,035 A | * | 4/1991 | Kuki et al. .................... | 49/352 |
| 5,036,621 A | * | 8/1991 | Iwasaki ........................ | 49/428 |
| 5,074,077 A | * | 12/1991 | Toyoshima et al. ............ | 49/352 |
| 5,505,022 A | * | 4/1996 | Shibata et al. ................ | 49/352 |
| 5,809,695 A |   | 9/1998 | Strickland | |
| 6,550,185 B1 | * | 4/2003 | Schlattor ....................... | 49/352 |
| 6,640,497 B1 | * | 11/2003 | Sakaguchi et al. ............ | 49/352 |
| 6,751,905 B1 | * | 6/2004 | Daumal Castellon ........ | 49/352 |
| 6,810,623 B1 | * | 11/2004 | Messlez et al. ............... | 49/374 |
| 2002/0066232 A1 | * | 6/2002 | Tatsumi et al. ................ | 49/502 |

(Continued)

FOREIGN PATENT DOCUMENTS

CN   2150093 Y   12/1993

(Continued)

*Primary Examiner*—Gregory J. Strimbu
(74) *Attorney, Agent, or Firm*—Sughrue Mion, PLLC

(57) ABSTRACT

A window regulator comprises a front guide rail installed in a front portion of a door and extending upward and downward; a rear guide rail installed in a rear portion of the door and extending upward and downward; a front carrier unit fixed to a lower front portion of the window pane and slidably engaged with the front guide rail through a first mechanism; and a rear carrier unit fixed to a lower rear portion of the window pane and slidably engaged with the rear guide rail through a second mechanism. The first mechanism is constructed to permit a pivotal movement of the front carrier unit about an imaginary axis that extends along the front guide rail. The second mechanism has a with a channel construction includes a slider on the rear carrier unit that is slidably received in a channel construction of the rear guide rail. The construction has a generally C-shaped cross section with its open side facing to the outside an exterior of the door when the door is mounted on a vehicle.

11 Claims, 9 Drawing Sheets

U.S. PATENT DOCUMENTS

2002/0162280 A1* 11/2002 Shah .......................... 49/352
2003/0097798 A1* 5/2003 Staser ........................ 49/502

FOREIGN PATENT DOCUMENTS

| | | | |
|---|---|---|---|
| CN | 1172032 | A | 2/1998 |
| CN | 2484209 | Y | 4/2002 |
| DE | 3243123 | A1 | 5/1984 |
| EP | 1300269 | A1 | 9/2003 |
| JP | 3-23708 | | 3/1991 |

* cited by examiner

WINDOW REGULATOR

BACKGROUND OF THE INVENTION

1. Field of the Invention

The present invention relates in general to window regulators, and more particularly, to the window regulators of a type that regulates a window pane installed in an automotive door having no sash.

2. Description of the Related Art

Hitherto, various types of window regulars have been proposed and put into practical use particularly in the field of automotive doors. One of them is shown in Japanese Patent Second Provisional Publication 3-23708. The window regulator of this publication is of a type that regulates a window pane installed in an automotive side door having no sash. The doors having no sash will be referred to as "sashless door" hereinafter for ease of description.

The window regulator of the publication generally comprises front and rear guide rails installed in a door, front and rear carrier units connected to lower portions of a window pane and slidably engaged with the front and rear guide rails, and an electric drive unit installed in a lower part of the door to drive the front and rear carrier units and thus the window pane to move upward and downward along the front and rear guide rails. The drive unit comprises an electric motor, a drum driven by the motor and a cable wire put around the drum. The cable wire extends around the front and rear guide rails and has two portions secured to the front and rear carrier units. When the motor is energized to run, the front and rear carrier units and thus the window pane are moved upward or downward along the front and rear guide rails.

When, in case of a sashless door, the door is in its closed position with its window pane kept fully raised, a peripheral portion of the window pane is pressed against a weather strip fixed to a vehicle body thereby to achieve a water tight sealing therebetween.

As is known, under a high speed cruising of motor vehicles, a reduced pressure zone is inevitably produced around an outside surface of the window pane. Production of such reduced pressure zone biases the window pane to incline outward increasing the possibility of lowering the air-tightness between the window pane and the weather strip.

In order to suppress or minimize such undesirable outward inclination of the window pane, various measures have been put into practical use. One is to produce the guide rails especially the rear guide rail by a thicker steel plate and closely engage the rear carrier unit with the rear guide rail. One is to arrange the front and rear guide rails to assume an exaggerated angle relative to the door by taking into consideration a possible outward inclination of the window pane that would occur during a high speed cruising.

SUMMARY OF THE INVENTION

However, even if the window regulator is constructed and arranged in the above-mentioned manner, it has been difficult to suppress the undesirable outside inclination of the window pane in a satisfied manner. On the contrary, it tends to occur that the upward and downward movement of the window pane is not smoothly carried out due to a certain resistance produced when the carrier units slide along the guide rails.

Accordingly, it is an object of the present invention to provide a window regulator which is free of the above-mentioned drawbacks.

According to a first aspect of the present invention, there is provided a window regulator installed in a door having a window pane. The window regulator comprises a front guide rail installed in a front portion of the door and extending upward and downward; a rear guide rail installed in a rear portion of the door and extending upward and downward; a front carrier unit fixed to a lower front portion of the window pane, the front carrier unit being slidably engaged with the front guide rail through a first mechanism, the first mechanism permitting a pivotal movement of the front carrier unit about an imaginary axis that extends along the front guide rail; and a rear carrier unit fixed to a lower rear portion of the window pane, the rear carrier unit being slidably engaged with the rear guide rail through a second mechanism, the second mechanism including a channel construction possessed by the rear guide rail and a slider possessed by the rear carrier unit and slidably received in the channel construction, the channel construction having a generally C-shaped cross section with its open side facing in a direction of a thickness of the door.

According to a second aspect of the present invention, there is provided an window regulator for use in an automotive sashless type door having a window pane. The window regulator comprises a module base plate; front and rear guide rails each being mounted on the module base plate through upper and lower bolts, the lower bolt being of an adjusting type which changes a distance between the lower portion of the guide rail and the module base plate when turned about an axis thereof; front and rear carrier units slidably engaged with the front and rear guide rails respectively and secured to lower front and rear portions of the window pane; an electric drive unit mounted on the module base plate to drive the front and rear carrier units along the frond and guide rails with an electric power, wherein the front guide rail includes an elongate channel portion and an elongate guide plate portion which extends along the channel portion, the elongate guide plate portion having a generally L-shaped cross section; wherein the front carrier unit includes a slider that has a guide slit of generally L-shaped cross section for slidably receiving therein the elongate guide plate portion, so that the front carrier unit is permitted to pivot about an axis of the elongate guide plate portion when applied with an external force; wherein the rear guide rail has a generally C-shaped cross section including a base wall, front and rear side walls raised from lateral ends of the base wall and front and rear flange portions extending toward each other from tops of the front and rear side walls; and wherein the rear carrier unit includes upper and lower sliders which are constructed of a plastic and slidably received in the rear guide rail.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a window regulator WR of the present invention will be described in detail with reference to the accompanying drawings.

In order to facilitate the description, various directional terms, such as, right, left, upper, lower, rightward and the like may be used in the following description. However, such terms are to be understood with respect to only a drawing or drawings on which the corresponding part or portion is shown.

Figure 1:
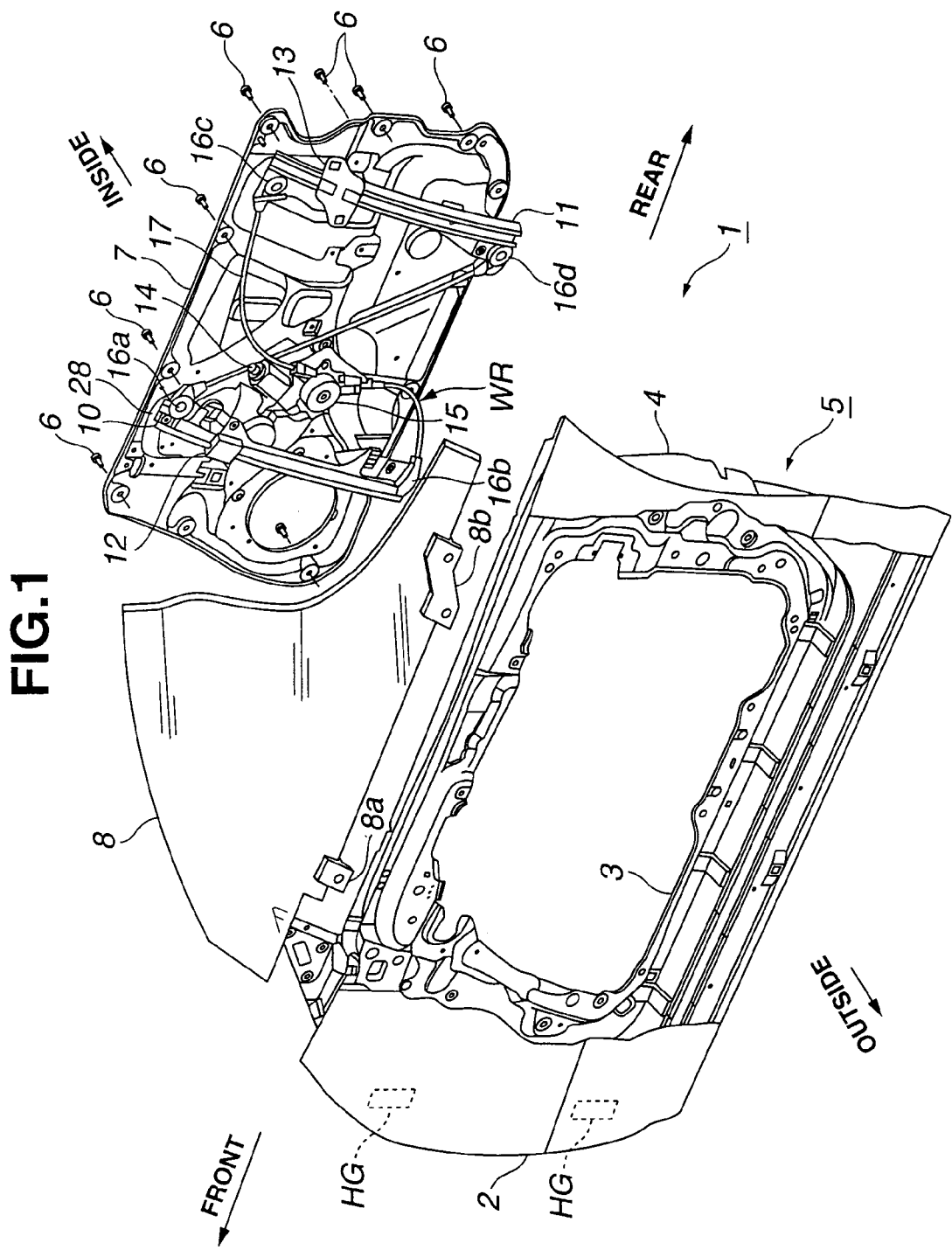
FIG. 1 is an exploded and partially cut view of an automotive door to which a window regulator of the present invention is practically applied.

In FIG. 1, there is shown but in an exploded manner an automotive door 1 to which the window regulator WR of the present invention is practically applied. The door 1 is of a sashless type and designed as a side door which is pivotally connected at its front end to a side body (not shown) of an associated motor vehicle through hinges HG.

As shown, the door 1 comprises a door proper 5 which includes an outer panel 2 of steel plate and an inner panel 4 of steel plate with an opening 3, these outer and inner panels 2 and 4 being spot-welded at their peripheral hemmed edges in a known manner. A module base plate 7 is secured through bolts 6 to an outside surface of the inner panel 4 in a manner to cover the opening 3. Thus, the door 1 has therein a certain space defined between the outer and inner panels 2 and 4.

The window regulator WR is mounted on an inside surface of the module base plate 7 in a manner to be exposed to the inner space of the door 1. It is to be noted that the window regulator WR is previously assembled on the module base plate 7 before the latter is fixed to the inner panel 4.

Within the inner space of the door 1, there is vertically movably received a window pane 8. As shown, the window pane 8 has a gently curved front edge and thus has a center of gravity at a rear portion thereof.

Figure 2:
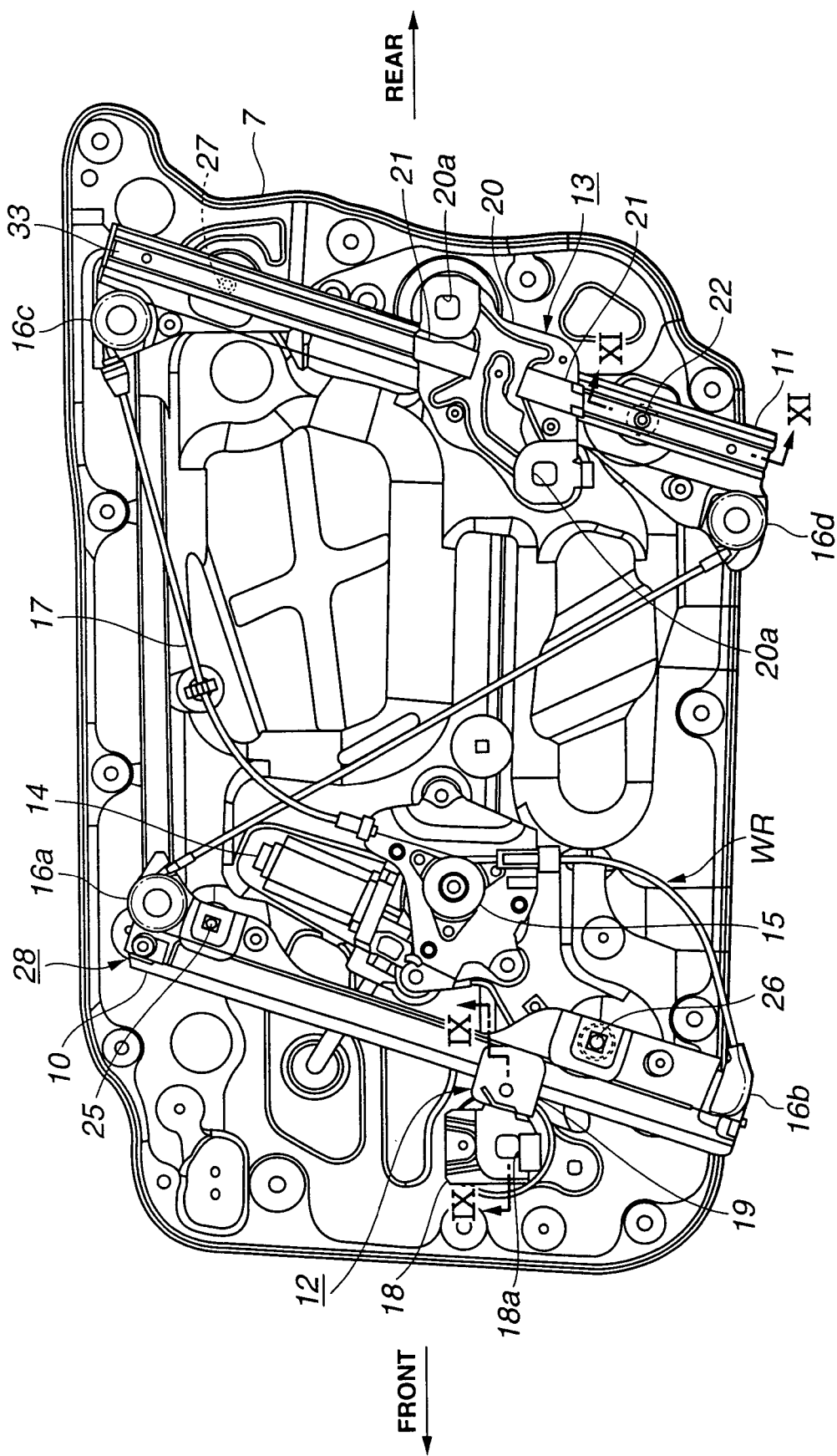
FIG. 2 is a front view of a door module on which the window regulator of the invention is entirely mounted.

As is best shown in FIG. 2, the window regulator WR comprises front and rear guide rails 10 and 11 fixed to the module base plate 7. Each rail 10 or 11 extends vertically but obliquely, as shown. The front guide rail 10 has upper and lower wire guide members 16a and 16b, and the rear guide rail 11 has upper and lower wire guide members 16c and 16d. The guide members 16a, 16c and 16d are of a roller type.

A front carrier unit 12 and a rear carrier unit 13 are slidably engaged with the front and rear guide rails 10 and 11 respectively. These carrier units 12 and 13 hold lower front and lower rear edges of the window pane 8. Between the guide rails 10 and 11, there is arranged a drum 15 which is mounted on the module base plate 7 near the front guide rail 10. Near the drum 15, an electric motor 14 is arranged which drives the drum 15 in normal and reverse directions. An endless cable wire 17 is put around the four wire guide members 16a, 16b, 16c and 16d having a portion wounded around the drum 15 and two portions fixed to the front and rear carrier units 12 and 13. The cable wire 17 thus includes a first part that extends from the first wire guide member 16a to the second wire guide member 16b and is fixed to the front carrier unit 12, a second part that extends from the second wire guide member 16b to the third guide member 16c and has the portion wound about the drum 15, a third part that extends from the third wire guide member 16c to the fourth wire guide member 16d and is fixed to the rear carrier unit 13, and a fourth part that extends from the fourth wire guide member 16d to the first wire guide member 16a. Thus, when the motor 14 is energized to run in one direction, the wire cable 17 is moved in one direction moving the front and rear carrier units 12 and 13 and thus the window pane 8 upward or downward along the front and rear guide rails 10 and 11. As is described hereinabove, the window regulator WR is previously assembled on the module base plate 7, and the module base plate 7 is connected to the inner panel 4 of the door 1 in a manner to cover the opening 3.

When the drum 15 is rotated in a normal direction by the motor 14, the wire cable 17 is driven, that is, the second part of the wire cable 17 having the portion wound around the drum 15 runs in a direction from the second wire guide member 16b to the third wire guide member 16c, and thus the front and rear carrier units 12 and 13 and thus the window pane 8 are moved downward along the front and rear guide rails 10 and 11, that is, in a direction to open a window opening.

While, when the drum 15 is rotated in a reverse direction, the second part of the wire cable 17 runs in a direction from the third wire guide member 16c to the second wire guide member 16b, and thus the front and rear carrier units 12 and 13 and thus window pane 8 are moved upward along the guide rails 10 and 11, that is, in a direction to close the window opening.

The front and rear guide rails 10 and 11 are of a channel member produced by pressing a steel plate.

As shown in FIG. 2, the front guide rail 10 has upper and lower flanges which are fixed to the module base plate 7 by upper and lower bolts 25 and 26 respectively. The lower bolt 26 is of an adjusting type, and thus, a distance between the lower flange and the module base plate 7 is adjustable by turning the lower bolt 26 about its axis.

Figure 9:
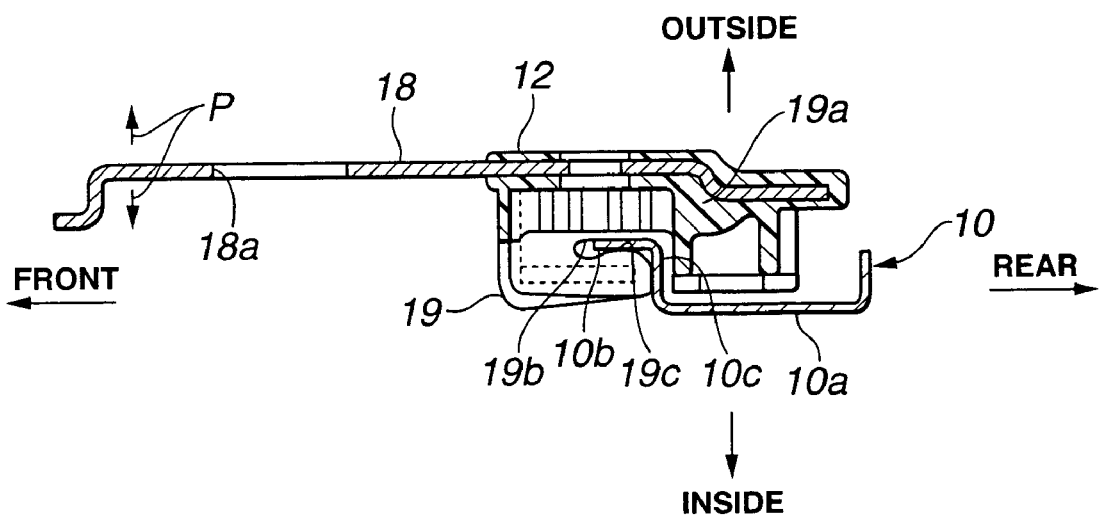
FIG. 9 is a sectional view taken along the line IX—IX of FIG. 2.

As is seen from FIG. 9, the front guide rail 10 comprises an elongate channel portion 10a and an elongate guide plate portion 10b which extends along the channel portion 10a. It is to be noted that, with respect to the door 1, the groove defined by the channel portion 10a faces outside and the guide plate portion 10b projects forward.

Figure 12:
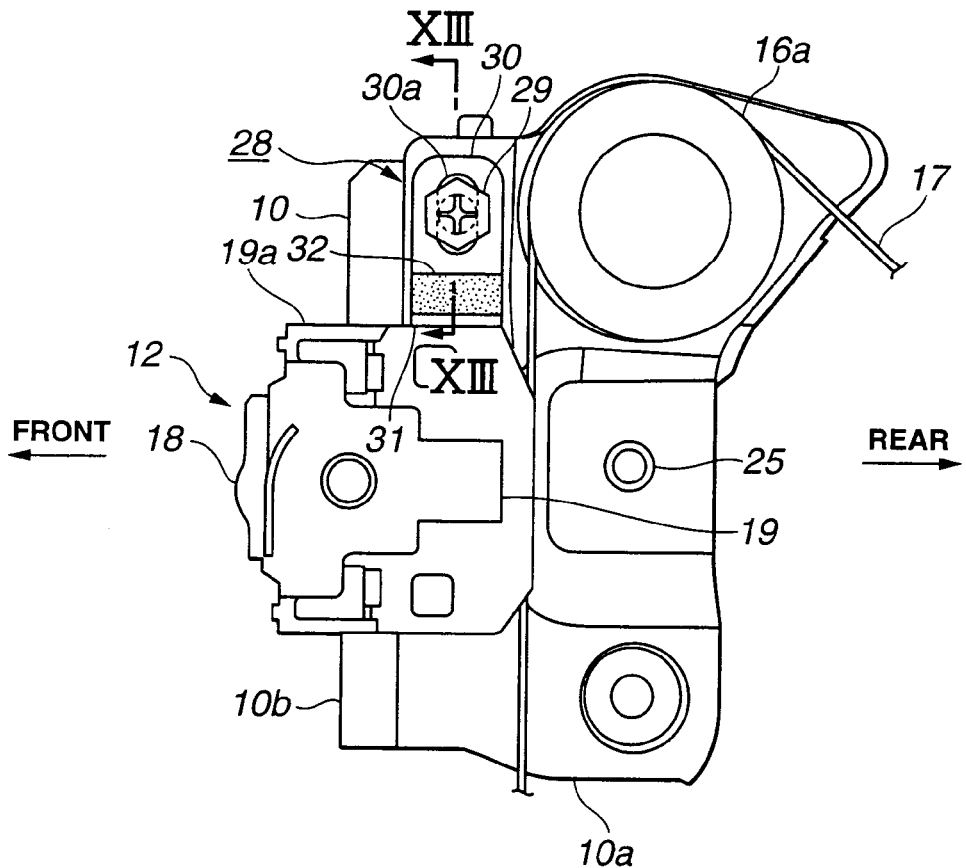
FIG. 12 is an enlarged front view of an upper portion of the front guide rail.
Figure 13:
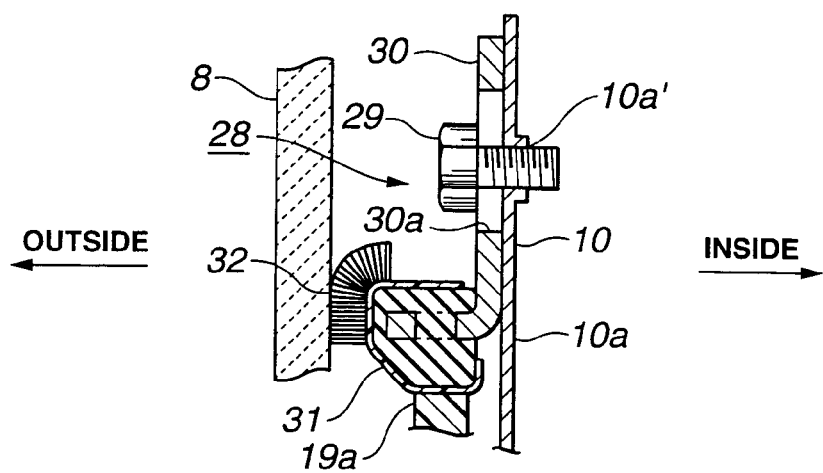
FIG. 13 is a sectional view taken along the line XIII—XIII of FIG. 12.

As is seen from FIGS. 12 and 13, the front guide rail 10 has at its upper end a stopper 28 for stopping the window pane 8 at a predetermined uppermost position (viz., a full closed position). The stopper 28 comprises an L-shaped metal plate 30 fixed to the guide rail 10 by a bolt 29, an elastic member 31 mounted to a lower projection of the metal plate 30 and a brush member 32 fixed to the elastic member 31. As is seen from FIG. 13, the brush member 32 contacts an inside surface of the window pane 8.

As is seen from FIG. 13, the L-shaped metal plate 30 has at its base portion an elongate slot 30a through which the bolt 20 passes for engagement with a threaded opening 10a' formed in a bottom wall of the elongate channel portion 10a of the front guide rail 10. Thus, by loosening the bolt 29, the position of the metal plate 30, that is, the position of the stopper 28 is changed.

When the window pane 8 is moved up to its uppermost position (viz., the full closed position) by the front and rear carrier units 12 and 13, the base portion 19a of the plastic slider 19 of the front carrier unit 12 abuts against the fixed elastic member 31 to suppress an excessive upward movement of the window pane 8, as is understood from FIG. 13.

Figure 10:
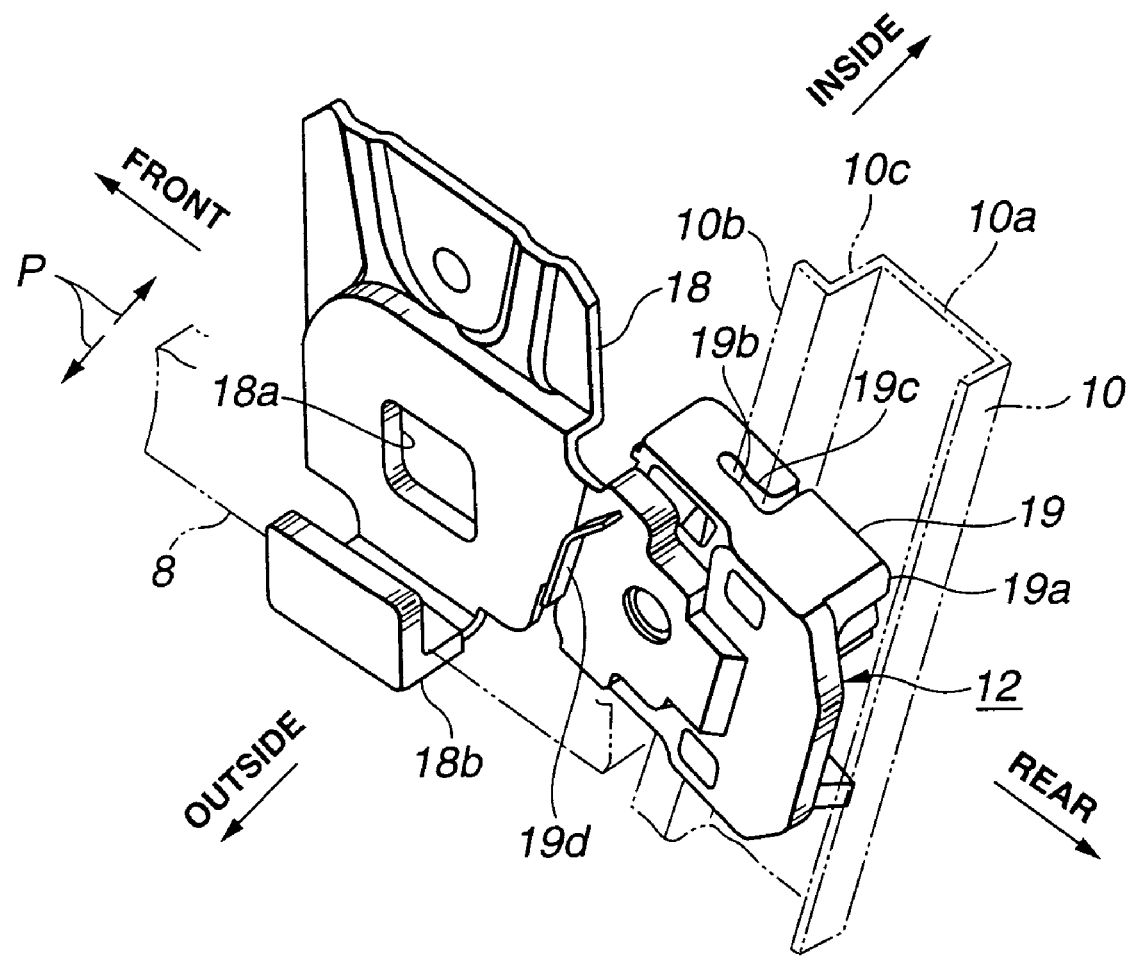
FIG. 10 is a perspective view of a front carrier unit incorporated with a front guide rail, the front carrier unit and the front guide rails being parts of the window regulator of the invention.

As is seen from FIGS. 9 and 10, the front carrier unit 12 comprises a metal plate 18 and a plastic slider 19 fixed to a rear part of the metal plate 18. As has been mentioned hereinabove, the front carrier unit 12 is fixed to the first part of the cable wire 17 which extends between the first and second guide members 16a and 16b.

As is best shown in FIG. 10, the metal plate 18 is formed at its front part with a rectangular opening 18a through which a bolt (not shown) passes for engagement with a threaded opening (no numeral) of a front holder 8a (see FIG. 1) fixed to the lower front end of the window pane 8. The metal plate 18 is provided at a lower part thereof with an L-shaped holder 18b by which the lower front end of the window pane 8 is held.

As is shown in FIG. 10, the plastic slider 19 is formed with a resiliently deformable position restricting piece 19d against which a rear end of the holder 8a (see FIG. 1) abuts for restricting a rearward movement of the window panel 8.

As shown, the base portion 19a of the plastic slider 19 is projected toward the channel portion 10a of the front guide rail 10. As shown, the base portion 19a is formed with a guide slit 19b that has a generally L-shaped cross section. The guide slit 19b receives slidably therein the elongate guide plate portion 10b of the front guide rail 10, so that the upward and downward movement of the front carrier unit 12 along the front guide rail 10 is guided by the guide plate portion 10b. A rectangular portion 19c of the plastic slider 19 defined by the guide slit 19b slidably contacts an angled outer surface of the elongate guide plate portion 10b of the guide rail 10.

It is to be noted that due to a resiliency possessed by a front side wall 10c of the front guide rail 10, the entire construction of the front carrier unit 12 is permitted to pivot slightly in a direction of the arrow "P" (see FIGS. 9 and 10) about the front side wall 10c.

Referring back to FIG. 2, the rear guide rail 11 has upper and lower portions which are fixed to the module base plate 7 by upper and lower bolts 27 and 22 respectively. The lower bolt 22 is of an adjusting type, and thus, a distance between the lower portion and the module base plate 7 is adjustable by turning the lower bolt 22 about its axis.

The rear guide rail 11 has at its upper end an elastic stopper 33 fixed thereto against which an upper portion of the rear carrier unit 13 abuts for suppressing excessive upward movement of the window pane 8.

It is to be noted that the stopper 28 connected to the front guide rail 10 is of a position adjustable type (see FIGS. 12 and 13). Thus, by adjusting the position of the stopper 28, a leveled positioning between the front and rear carrier units 12 and 13 at the uppermost position (viz., full closed position) of the window pane 8 is easily achieved.

Figure 6:
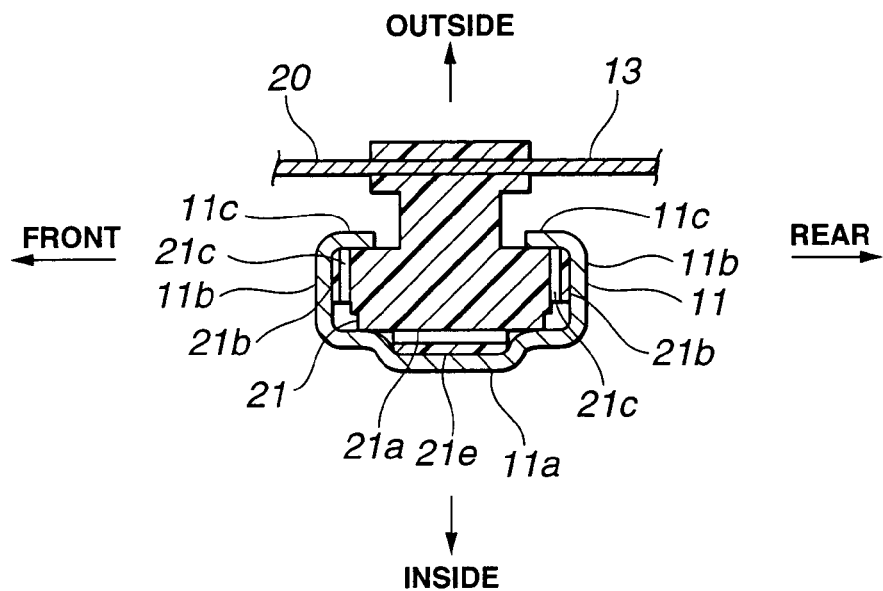
FIG. 6 is a sectional view taken along the line VI—VI of FIG. 3.
Figure 7:
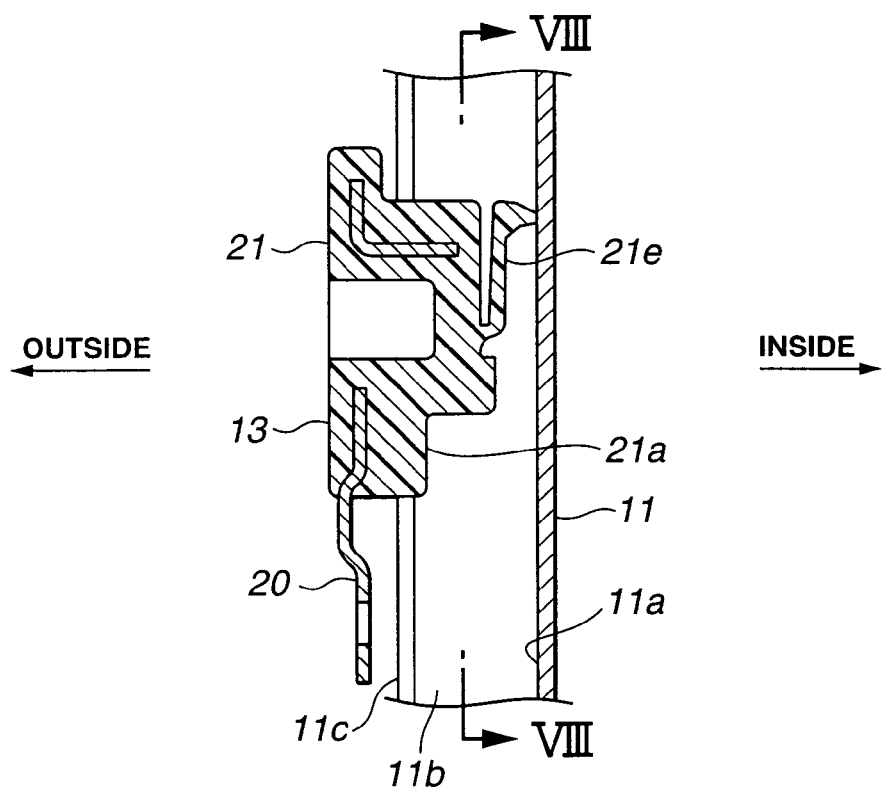
FIG. 7 is a sectional view taken along the line VII—VII of FIG. 3.
Figure 8:
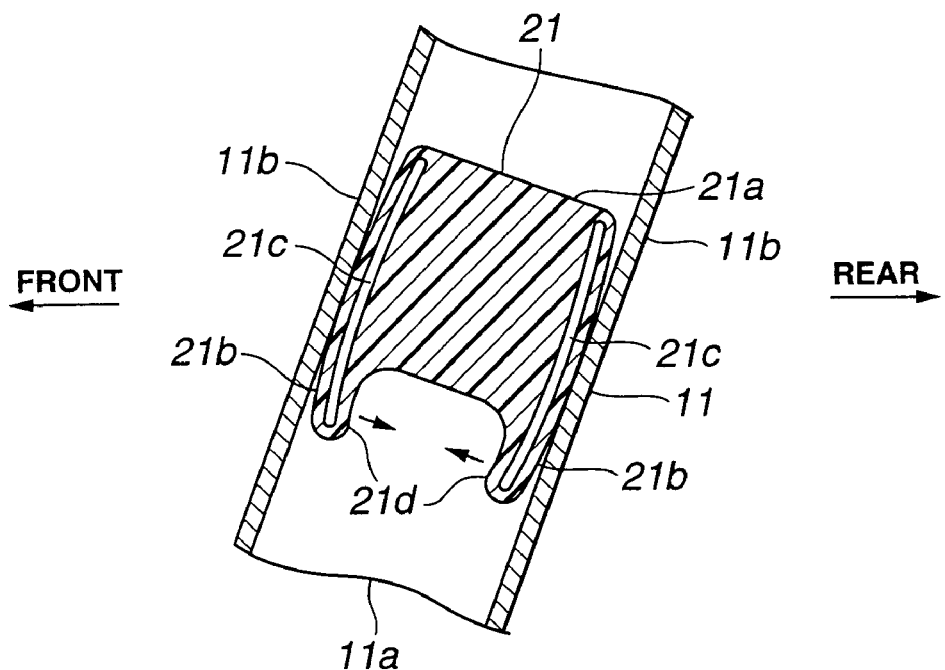
FIG. 8 is a sectional view taken along the line VIII—VIII of FIG. 7.

As is seen from FIGS. 6 to 8, the rear guide rail 11 is of a channel member having a generally C-shaped cross section including a base wall 11a, front and rear side walls 11b and 11b raised from lateral ends of the base wall 11a and front and rear flange portions 11c and 11c extending toward each other from tops of the front and rear side walls 11b and 11b.

As is seen from FIG. 2, the rear carrier unit 13 is slidably engaged with the rear guide rail 11 and fixed to the third part of the cable wire 17 that extends between the third and fourth wire guide members 16c and 16d.

Figure 3:
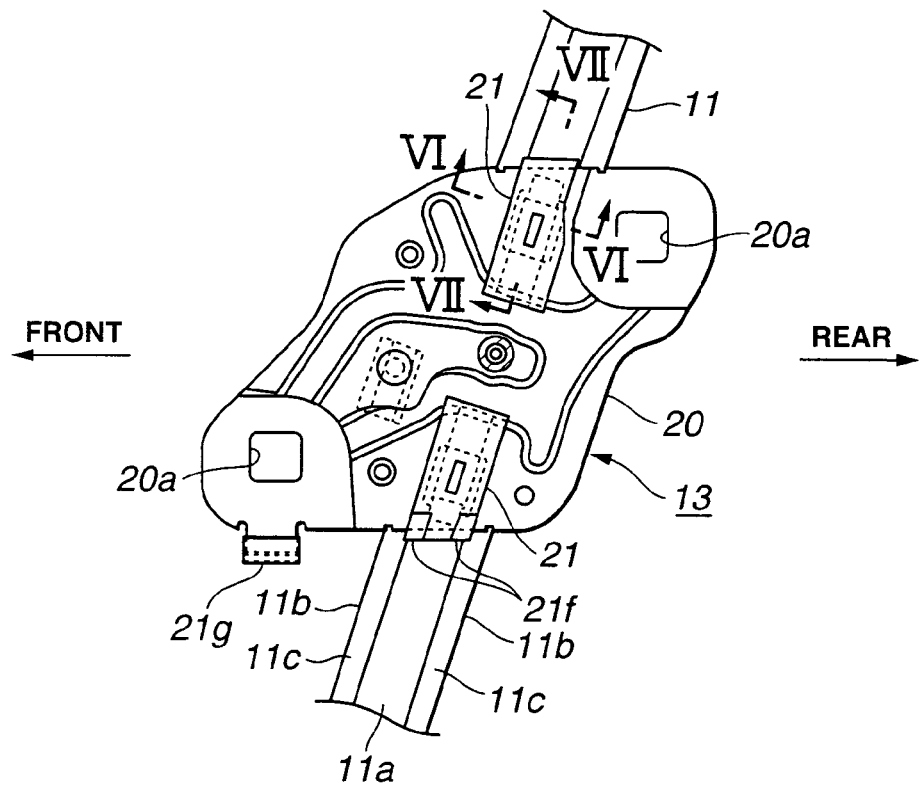
FIG. 3 is an enlarged front view of a rear carrier unit incorporated with a rear guide rail, the rear carrier unit and rear guide rails being parts of the window regulator of the invention.
Figure 4:
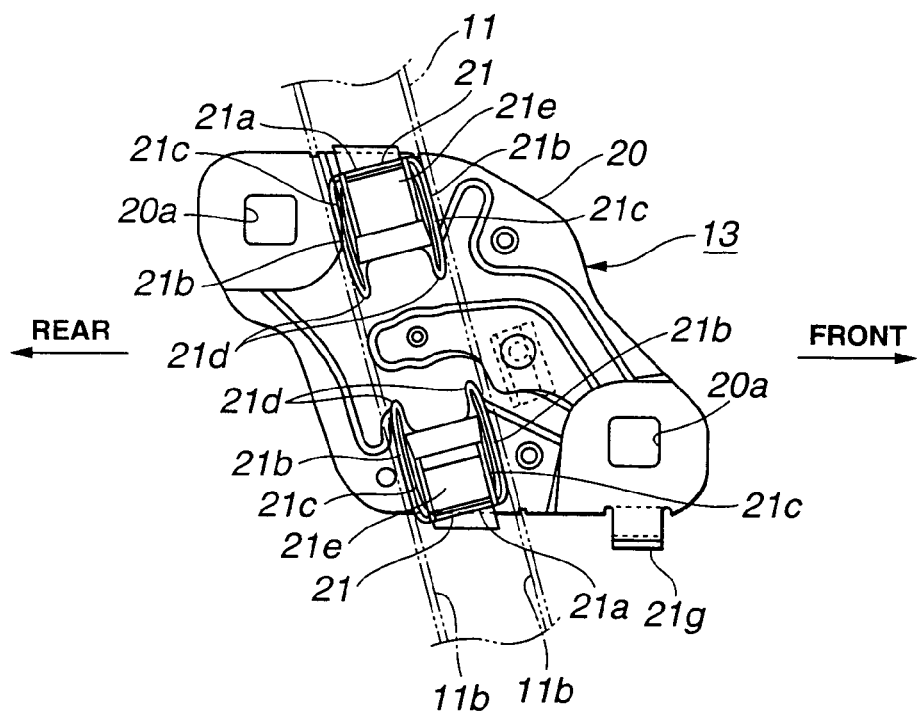
FIG. 4 is an enlarged back view of the rear carrier unit incorporated with the rear guide rail.
Figure 5:
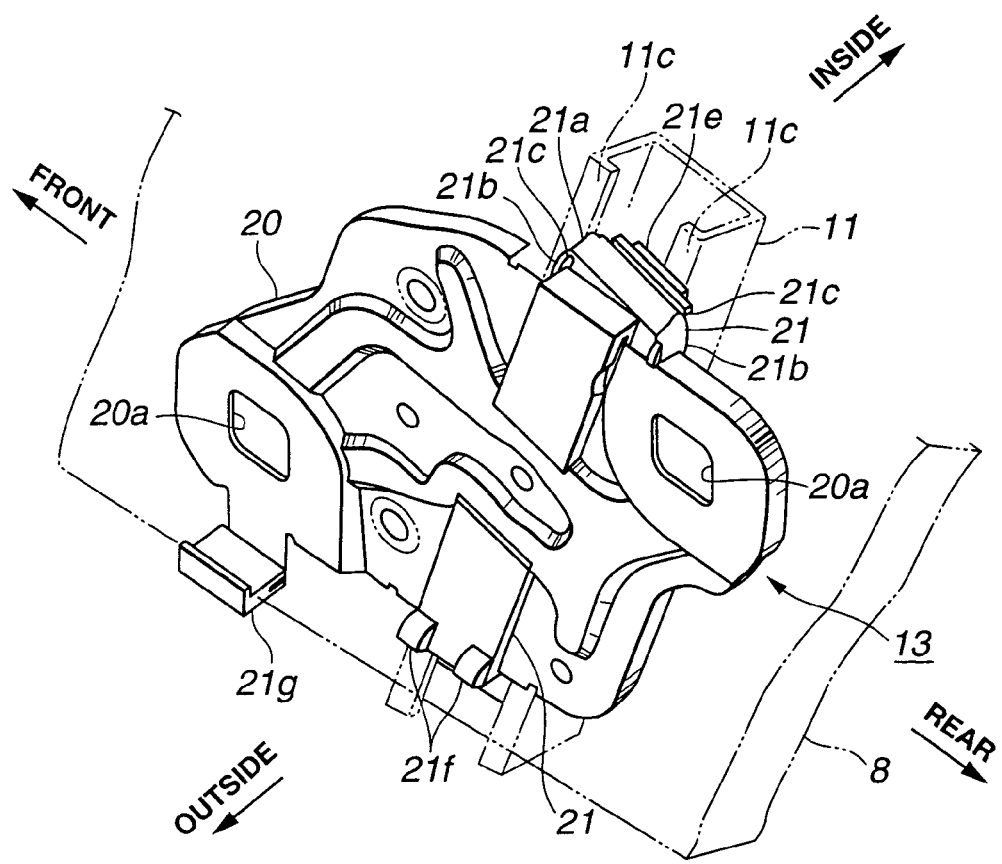
FIG. 5 is a perspective view of the rear carrier unit.

As is well shown in FIGS. 3 to 5, the rear carrier unit 13 comprises a metal plate 20 and upper and lower plastic sliders 21 and 21 fixed to the metal plate 20.

As is seen from FIG. 3, the metal plate 20 is formed with an upper rectangular opening 20a near the upper plastic slider 21 and a lower rectangular opening 20a near the lower plastic slider 21.

As is understood from FIG. 1, two connecting bolts (not shown) pass through the upper and lower openings 20a and 20a for engagement with respective threaded openings of a rear holder 8b fixed to the lower rear end of the window pane 8.

As is seen from FIGS. 4 and 5, each plastic slider 21 is formed with a generally rectangular base portion 21a that is projected into the rear guide rail 11 through a clearance defined between the front and rear flange portions 11c and 11c. That is, the two plastic sliders 21 and 21 slide in and along the rear guide rail 11 upward and downward.

As is seen from FIGS. 4 and 8, the base portion 21a of each plastic slider 21 is formed at one end thereof with two projections 21d and 21d.

As is seen from FIG. 8, each plastic slider 21 is formed with two gently curved slots 21c and 21c each extending between the base portion 21a and the corresponding projection 21d. With these slots 21c and 21c, both sides 21b and 21b of each plastic slider 21, which is gently curved, are resiliently pressed onto inner surfaces of the front and rear side walls 11b and 11b of the rear guide rail 11. Thus, upward and downward movement of the rear carrier unit 13 along the rear guide rail 11 is carried out with a certain sliding resistance generated between the slider 21 and the guide rail 11, which assures an assured and reliable movement of the rear carrier unit 13 without play of the same.

That is, any stress applied to the plastic slider 21 is dispersed in various directions due to the resiliency possessed by the sides 21b and 21b of the slider 21. It is to be noted that undesired stress concentration around a root area of the side 21b, which would occur in a conventional technique, is suppressed in the invention. Thus, repeated resilient deformation of the sides of the plastic slider 21 is allowed for a longer time, and thus, the assured and smoothed sliding movement of the rear carrier unit 13 along the rear guide rail 11 is obtained for a long time.

As is seen from FIGS. 6 and 7, the base portion 21a of each plastic slider 21 is formed at its bottom portion with a resilient pawl 21e which is resiliently pressed against an inner surface of the base wall 11a of the rear guide rail 11. As is seen from FIG. 6, the inner surface of the base wall 11a is formed with a longitudinally extending recess (no numeral) for smoothly guiding the resilient pawl 21e. Due to provision of the resilient pawl 21e, undesired play of the rear carrier unit 13 in a direction of the thickness of the door 1 is suppressed or at least minimized.

As is seen from FIGS. 3, 4 and 5, the two plastic sliders 21 and 21 are spaced from each other in an up-and-down direction, so that undesired play of the rear carrier unit 13 in a forward and rearward direction as well as in a direction of the thickness of the door 1 is suppressed or at least minimized.

If desired, the base portion 21a of each plastic slider 21 may be formed at both ends thereof with projections 21d and 21d, respectively. That is, each end is formed with two projections 21d and 21d.

As is seen from FIG. 5, the upper and lower rectangular openings 20a and 20a of the rear carrier unit 13 are spaced from each other in a diagonal direction. That is, the front opening 20a is positioned forward the rear guide rail 11 at generally the same level of the lower plastic slider 21, and the rear opening 20a is positioned rearward the rear guide rail 11 at generally the same level of the upper plastic slider 21.

Accordingly, the lower rear end of the window pane 8 (see FIG. 1) is connected to the rear carrier unit 13 at diagonally spaced two points, which brings about an assured and strong connection of the lower rear end of the window pane 8 with the rear carrier unit 13. Thus, even if, due to a negative pressure produced around the outside surface of the window pane 8 during a high speed cruising of the vehicle, an upper portion of the window pane 8 is applied with a marked force by which the window pane 8 is biased to incline forward and outward, such inclination of the window pane 8 is suppressed or at least minimized.

Furthermore, due to the sliding engagement of the upper and lower plastic sliders 21 and 21 of the rear carrier unit 13 with the rear guide rail 11, forward and outward inclination of the rear carrier unit 13 is prevented or at least minimized.

As is seen from FIG. 5, the lower plastic slider 21 is formed at a lower end with a pair of projections 21f and 21f which resiliently abut against an outside surface of the lower rear end of the window pane 8. Furthermore, as shown in the same drawing, the front metal plate 20 of the rear carrier unit 13 is formed with an L-shaped holder 21g on which the lower end of the window pane is held. Due to provision of such projections 21f and 21f and holder 21g, undesired outward inclination of the window pane 8, which would occur during a high speed cruising of the vehicle, is suppressed or at least minimized.

Figure 11:
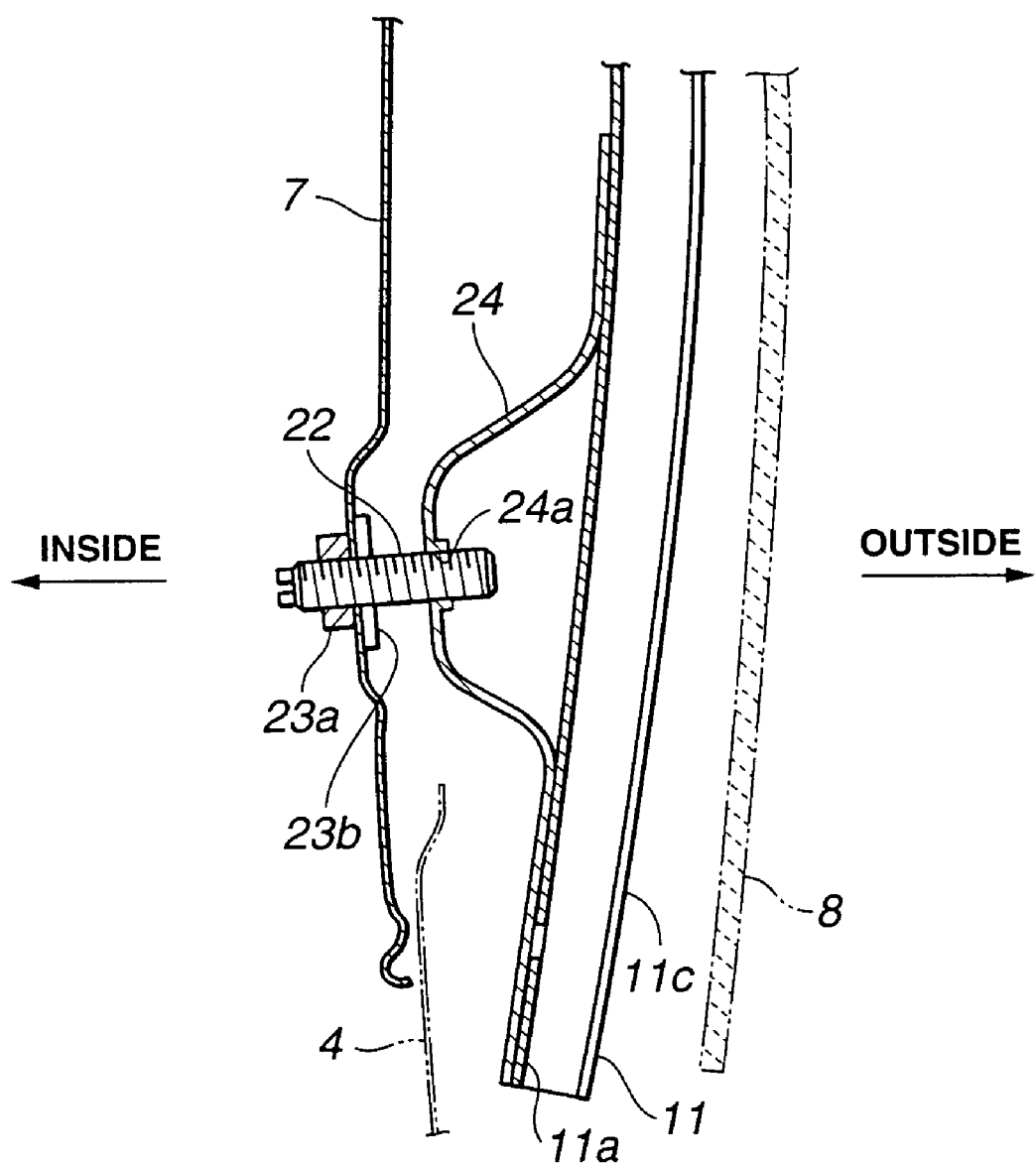
FIG. 11 is a sectional view taken along the line XI—XI of FIG. 2.

As is seen from FIG. 11, the adjusting bolt 22 for adjusting the distance between the lower portion of the rear guide rail 11 and the module base plate 7 is rotatably received in an opening (no numeral) formed in the module base plate 7. For keeping the bolt 22 on the module base plate 7, two holders 23a and 23b are fixed to inside and outside surfaces of the module base plate 7. A leading end of the adjusting bolt 22 is threaded with a threaded opening 24a formed in a raised bracket 24 fixed to the rear guide rail 11. Thus, when the adjusting bolt 22 is turned by a suitable tool such as a screw driver or the like, the distance between the module base plate 7 and the bracket 24, and thus, between the module base plate 7 and the rear guide rail 11 is changed or adjusted.

The adjusting bolt 26 for the lower portion of the front guide rail 10 (see FIG. 2) has substantially the same adjusting mechanism as that of the above-mentioned adjusting bolt 22.

When, as is understood from FIG. 2, a posture of the front and rear guide rails 10 and 11 is changed by manipulating the two adjusting bolts 26 and 22 independently, it may occur that the relative position between the front and rear guide rails 10 and 11 with respect to the door 1 differs from a predetermined target position.

However, as has been described hereinabove, since the front carrier unit 12 is arranged and constructed to be pivotal in the direction of the arrow "P" (see FIG. 10) about the front side wall 10c of the front guide rail 10, the positional dislocation of the two guide rails 10 and 11 is compensated by the pivoting of the front carrier unit 12, and thus, the front and rear carrier units 12 and 13 can smoothly run along the front and rear guide rails 10 and 11 even under presence of such positional dislocation therebetween.

As has been mentioned hereinabove, the rear lower portion of the window pane 8, which has a center of gravity at its rear portion, is tightly held by the rear carrier unit 13 that is reliably and slidably guided by the rear guide rail 11, which brings about a stable posture of the window pane 8 in the uppermost position (viz., full closed position) of the same.

As is described hereinabove, the window regulator according to the present invention can provide the window pane 8 with a stable uppermost position (viz., full closed position) even when an associated door is of a sashless type. Thus, even when the vehicle runs fast with the window pane 8 kept closed, undesired outward inclination of the window pane 8 is assuredly avoided. Furthermore, due to the above-mentioned measures employed therein, the window pane 8 can run very smoothly.

The entire contents of Japanese Patent Application 2002-194545 filed Jul. 3, 2002 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A window regulator installed in a door having a window pane, comprising:

a front guide rail installed in a front portion of the door and extending upward and downward;

a rear guide rail installed in a rear portion of the door and extending upward and downward;

a front carrier unit fixed to a lower front portion of the window pane, the front carrier unit being slidably engaged with the front guide rail through a first mechanism, the first mechanism permitting a pivotal movement of the front carrier unit about an imaginary axis that extends along the front guide rail; and a rear carrier unit fixed to a lower rear portion of the window pane, the rear carrier unit being slidably engaged with the rear guide rail through a second mechanism, wherein the second mechanism comprises upper and lower sliders that form part of the rear carrier unit and are slidably received in a channel construction defined by the rear guide rail, the channel construction having a generally C-shaped cross section with its open side facing toward an exterior side of the door, when the door is mounted on a vehicle, wherein the front guide rail comprises an elongate guide plate portion extending upwards and downwards along a longitudinal axis of the front guide rail, the elongate guide plate portion having a generally L-shaped cross section; and wherein said first mechanism comprises a slider on the front carrier unit, the slider of the front carrier unit having a guide slit of generally L-shaped cross section into which the elongate guide plate portion of the front guide rail is slidably inserted, the slider of the front carrier unit has a projection that slidably contacts an angled outer surface of the elongate guide plate portion of the front guide rail, wherein the rear carrier unit further comprises upper and lower mounting portions, the two mounting portions being connected to the lower rear portion of the window pane, wherein the upper mounting portion of the rear carrier unit is substantially level with the upper slider of the rear carrier unit and in which the lower mounting portion of the rear carrier unit is substantially level with the lower slider of the rear carrier unit, and the lower slider comprises projections that resiliently abut against one surface of the window pane.

2. A window regulator as claimed in claim 1, in which the front and rear guide rails are provided at upper ends thereof with stoppers for stopping upward movement of the front and rear carrier units respectively.

3. A window regulator as claimed in claim 2, in which one of the stoppers is a position adjusting stopper that is constructed to change a vertical position of the stopper.

4. A window regulator as claimed in claim 3, in which each of the stoppers is provided, respectively, with a brush member that contacts the one surface of the window pane.

5. A window regulator as claimed in claim 1, in which each of the front and rear guide rails is connected to the door through upper and lower connecting bolts, each lower connecting bolt being adjustable for changing a distance between a lower portion of the corresponding guide rail and the door when turned about its axis.

6. A window regulator as claimed in claim 1 further comprising:
  a module base plate to which the front and rear guide rails are mounted together with the front and rear carrier units;
    an electric drive unit mounted to the module base plate; and
    a cable wire driven by the electric drive unit, the cable wire having two portions each secured to a respective one of the front and rear carrier units, so that upon energization of the electric drive unit, the front and rear carrier units are moved along the front and rear guide rails.

7. A window regulator for use in an automotive door having a moveable window pane, comprising:
  a module base plate;
  front and rear guide rails, each being mounted on the module base plate through upper and lower bolts, each lower bolt being adjustable to change a distance between a lower portion of a respective one of the guide rails and the module base plate when turned about an axis thereof;
  front and rear carrier units slidably engaged with the front and rear guide rails respectively and securable to lower front and rear portions of the window pane;
  an electric drive unit mounted on the module base plate to drive the front and rear carrier units along the front and rear guide rails with electric power,
  wherein the front guide rail includes an elongate channel portion and an elongate guide plate portion which extends along the channel portion, the elongate guide plate portion having a generally L-shaped cross section;
  wherein the front carrier unit includes a slider that has a guide slit of generally L-shaped cross section for slidably receiving therein the elongate guide plate portion, so that the front carrier unit is permitted to pivot about a longitudinal axis of the elongate guide plate portion when applied with an external force;
  wherein the rear guide rail has a generally C-shaped cross section including a base wall, front and rear side walls raised from lateral ends of the base wall and front and rear flange portions extending toward each other from tops of the front and rear side walls; and
  wherein the rear carrier unit includes upper and lower sliders which are constructed of a plastic and slidably received in the rear guide rail.

8. A window regulator as claimed in claim 7, in which each of the upper and lower sliders comprises:
  a generally rectangular base portion;
  two projections integral with and formed on one end of the base portion; and
  two curved slots being formed by and extending between the projections and the base portion, so that the slider has resiliently deformable side portions which are slidably pressed against the side walls of the rear guide rail.

9. A window regulator as claimed in claim 8, in which each of the upper and lower slides is integrally formed with a resilient pawl that is resiliently and slidably pressed against the base wall of the rear guide rail.

10. A window regulator as claimed in claim 9, in which the base wall of the rear guide rail is formed with a longitudinally extending recess for guiding the resilient pawls.

11. A window regulator as claimed in claim 10, in which the rear carrier unit is adapted to be fixed to the lower rear portion of the window pane through two connecting bolts which are spaced from each other.

* * * * *